(12) United States Patent
Kim

(10) Patent No.: US 6,633,527 B1
(45) Date of Patent: Oct. 14, 2003

(54) HIGH-DENSITY DISK RECORDING MEDIUM AND APPARATUS AND METHOD OF REPRODUCING DATA RECORDED THEREIN

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 09/678,334

(22) Filed: Oct. 3, 2000

(30) Foreign Application Priority Data

Oct. 5, 1999 (KR) ............................................. 99-42931

(51) Int. Cl.$^7$ ................................................. G11B 7/00
(52) U.S. Cl. ................. 369/59.1; 369/59.13; 369/59.17
(58) Field of Search ......................... 369/47.17, 53.31, 369/59.1, 59.21, 124.15, 47.35, 59.13

(56) References Cited

U.S. PATENT DOCUMENTS

| | | | |
|---|---|---|---|
| 5,121,377 A | * 6/1992 | Short | .......................... 369/100 |
| 6,201,774 B1 | * 3/2001 | Oh et al. | ....................... 369/54 |
| 6,259,664 B1 | * 7/2001 | Kwang | ..................... 369/53.15 |
| 6,295,258 B1 | * 9/2001 | Kaku et al. | ............... 369/47.15 |
| 6,324,135 B1 | * 11/2001 | Kim et al. | ................ 369/47.17 |

* cited by examiner

*Primary Examiner*—Nabil Hindi
(74) *Attorney, Agent, or Firm*—Birch, Stewart, Kolasch & Birch, LLP

(57) ABSTRACT

The present invention relates to a disk recording medium such as a CD or a DVD in which data is recorded in high-density, and method and apparatus for reproducing data recorded in the high-density disk recording medium. The data reproducing method and apparatus according to the present invention converts a high-frequency signal reproduced from the disk into a plurality of binary signals through comparing the reproduced signal with two or more slicing levels which are different each other, selects one of the plurality of binary signals or a periodic pulse signal based on the difference magnitude between the plurality of binary signals, synchronizes a reference clock with the selected signal, and restores the selected signal into bit stream using the synchronized reference clock. This method and apparatus enables mark or pit and/or space shorter than the radius of a reproducing beam spot to be restored into corresponding bit train, therefore, enhancing the recording capacity of a track formed on an optical disk.

14 Claims, 5 Drawing Sheets

HIGH-DENSITY DISK RECORDING MEDIUM AND APPARATUS AND METHOD OF REPRODUCING DATA RECORDED THEREIN

BACKGROUND OF THE INVENTION

1. Field of the Invention

The present invention relates to a disk recording medium such as a compact disk (CD) or a digital versatile disk (DVD) in which data is recorded in high-density, and method and apparatus for reproducing data recorded in the high-density disk recording medium.

2. Description of the Related Art

FIG. 1 is a partial block diagram of a conventional optical disk device for reproducing data from a disk. The disk device of FIG. 1 comprises an optical pickup 2 for detecting recorded signals from an optical disk 1 such as a CD or a DVD, a signal detector 3 for yielding a reproduced RF signal through adding the signal components detected from the disk 1, a comparator 4 for converting the reproduced RF signal into a binary signal through triggering the RF signal with a reference zero level, a phase lock loop 5 (PLL) for synchronizing an internal reference clock with the binary signal, a bit stream generator 6 for generating a bit stream according to level and its length of the binary signal using the synchronized reference clock, and a demodulator 7 for restoring original digital data from the bit stream through correcting error, if any, with error correction code contained in the bit stream.

The conventional data reproducing operation conducted by the optical device of FIG. 1 is described.

The optical pickup 2 makes a laser beam be incident onto mark or pit trains formed along a track of a recording surface of the disk 1 as shown in FIG. 2, and converts the reflected beam from the beam spot into an electrical signal. The beam reflected from a mark or a pit is converted into a low-level electrical signal, whereas the reflected one from a space between marks or pits is converted into a high-level signal.

The components of the converted electrical signal are added in the signal detector 3 and then results in a RF reproduced signal which is applied to the comparator 4. The comparator 4 converts the RF reproduced signal into a binary signal which has only two levels through triggering the RF signal above and below a reference slicing level, and applies the binary signal to the PLL 5 which synchronizes an internal reference clock with the binary signal in phase. For example, the PLL 5 adjusts the clock speed of a 4.3218 MHz internal reference clock to have the falling edge of the internal clock coincided with that of the reproduced binary signal if the disk 1 is a compact disk. Then, the PLL 5 applies the synchronized reference clock and the binary signal to the bit stream generator 6.

The bit stream generator 6 converts the binary signal corresponding to marks and spaces formed in the disk 1 into bit stream referring to the synchronized reference clock, and the demodulator 7 restores the bit stream into original data while correcting the restored data based on the channel correction code contained in the bit stream.

To be brief, electrical signal components detected from a general optical disk by the pickup 2 are added into a reproduced RF signal which is converted into a binary signal after being compared with a reference slicing level, and then is converted into a bit stream based on a reference clock synchronized with the binary signal in phase.

Therefore, the minimum length of a mark or a pit to be formed in an optical disk should be long so that a RF curve generated corresponding to the mark or pit might cross the reference slicing level to be triggered without jitter.

In case that an optical disk is a CD for which the reference clock is 4.3218 MHz, the minimum length of a pit or a space is specified to three pulses, i.e., 3T, which corresponds to 0.86677 μm, among related companies so that an RF curve produced from the shortest pit formed in the CD might be converted into a bit stream normally.

In the meantime, the related companies are developing a technology to increase the recording capacity of an optical disk. The technology under development is to use a blue laser beam of which wavelength is shorter than that of conventional laser beam, or is to shorten the marginal gap, which is called as 'pitch', between two tracks.

However, since the requirement that a RF curve generated corresponding to a minimum-length mark or pit have enough transition duration to cross the reference slicing level without jitter should be still satisfied, the shortest mark or pit is not inevitably less than 3T, which puts restriction on increasing recording capacity of a track.

SUMMARY OF THE INVENTION

It is an object of the present invention to provide apparatus and method of reproducing data recorded in an optical disk, which compares a RF signal reproduced from a disk with multistage reference level and converts the RF signal or self-generated periodic pulse corresponding to a minimum-length mark or pit into bit stream based on the difference between binary signals resulted from the comparison, thereby enabling a minimum-length mark or pit to be formed more shortly than a conventional minimum-length one.

An optical disk according to the present invention records data in the form of marked phase and unmarked phase such that the length of one or more marked phases or unmarked phases is shorter than a radius of a reproducing beam spot.

An apparatus for reproducing data from an optical disk according to the present invention, comprises a signal detector converting a high-frequency signal reproduced from the disk into a plurality of binary signals through comparing the reproduced signal with two or more slicing levels which are different each other, and outputting one of the plurality of binary signals or a periodic pulse signal based on the difference magnitude between the plurality of binary signals; and a data converter synchronizing a reference clock with the signal from said signal detector and restoring the signal from said signal detector into bit stream using the synchronized reference clock.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, preferred embodiments thereof will now be described with reference to the accompanying drawings.

Figure 1:
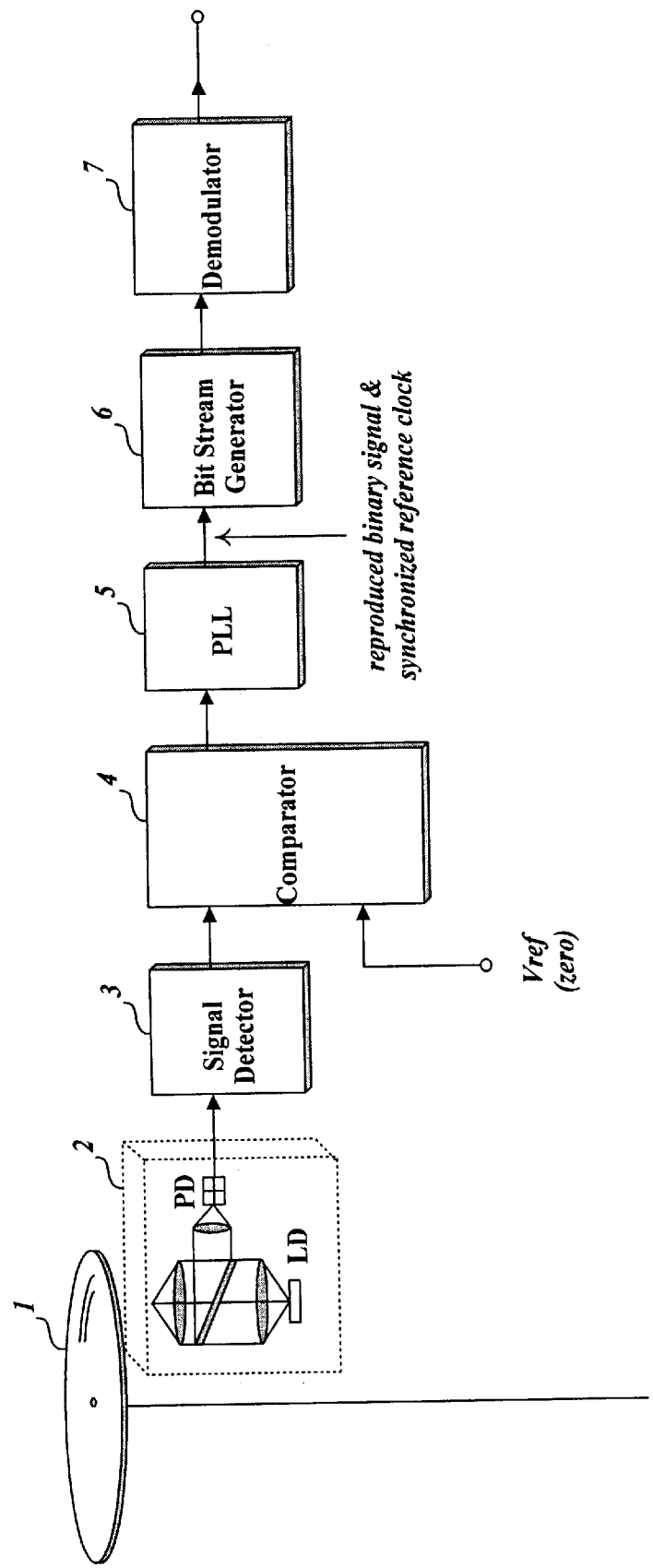
FIG.1 is a partial block diagram of a conventional optical disk device for reproducing data from a disk.
Figure 2:
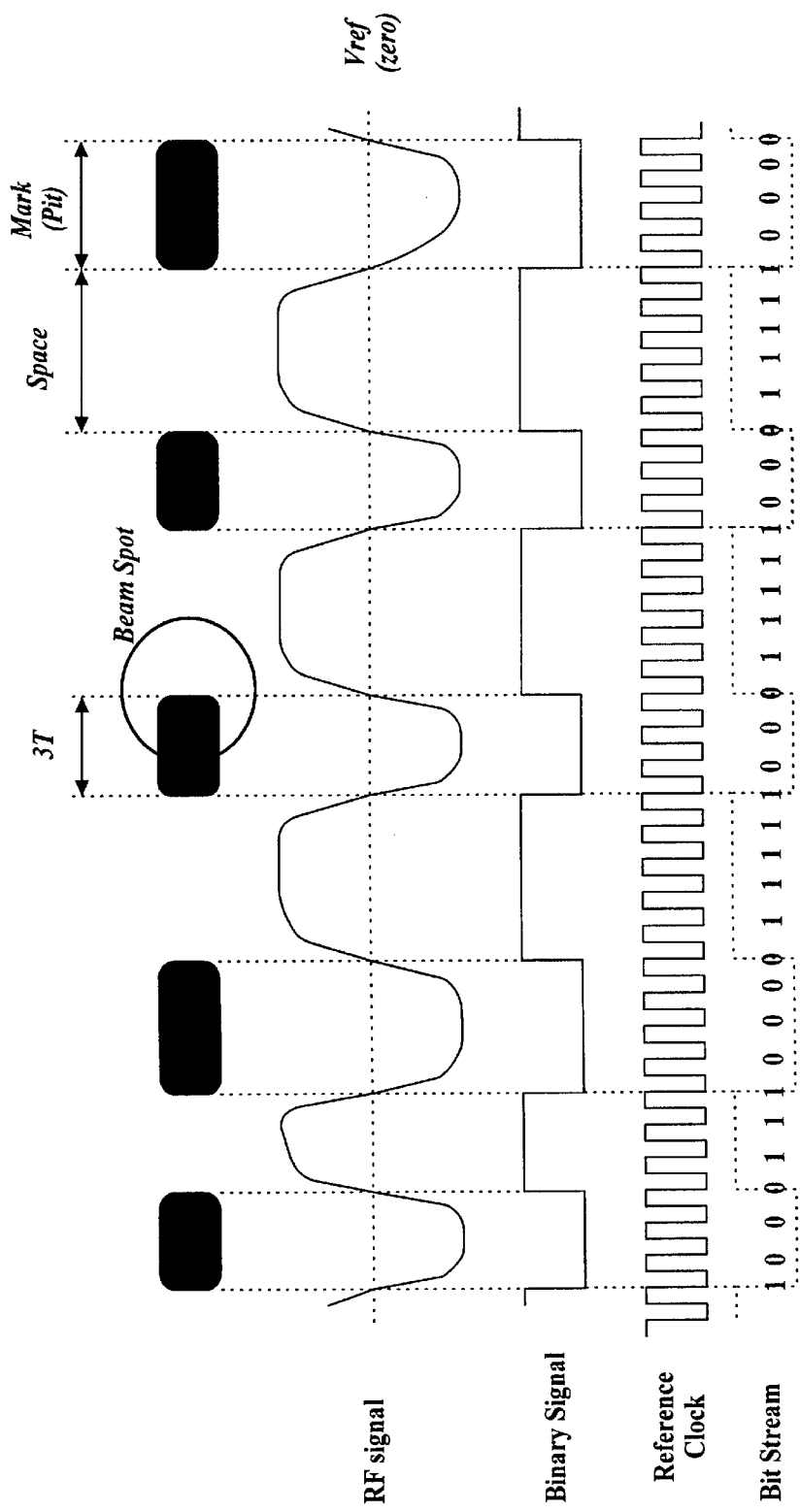
FIG. 2 shows an example of recorded mark or pit pattern and waveforms produced at several points of the apparatus of FIG. 1 when reproducing the pattern.
Figure 3:
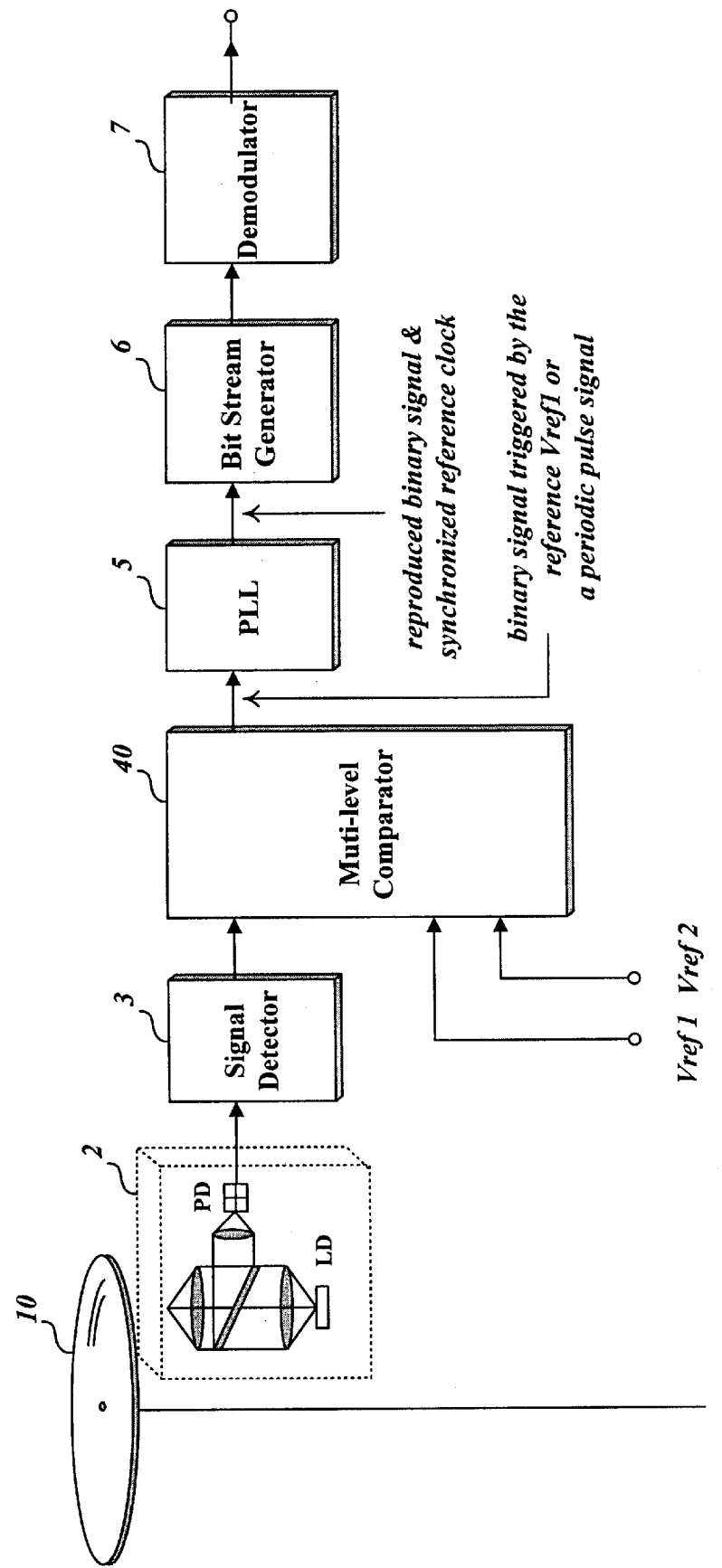
FIG. 3 is a partial block diagram of an optical disk device according to the present invention.

FIG. 3 is a partial block diagram of an optical disk device according to the present invention. The disk device of FIG. 3 comprises an optical pickup 2 for detecting recorded signals from an optical disk 10 having marks/pits and/or spaces formed according to the present invention, a signal detector 3 for yielding a reproduced RF signal through adding the signal components detected from the disk 10, a multi-level comparator 40 for converting the reproduced RF signal into two binary signals through triggering the RF signal with different reference levels 'Vref1' and 'Vref2', a PLL 5 for synchronizing an internal reference clock with the signal from the multi-level comparator 40 in phase, a bit stream generator 6 for generating bit train according to signal state and its length of the signal from the multi-level comparator 40 based on the synchronized reference clock, and a demodulator 7 for restoring original digital data from the bit stream through correcting error, if any, with error correction code contained in the bit stream.

Figure 4:
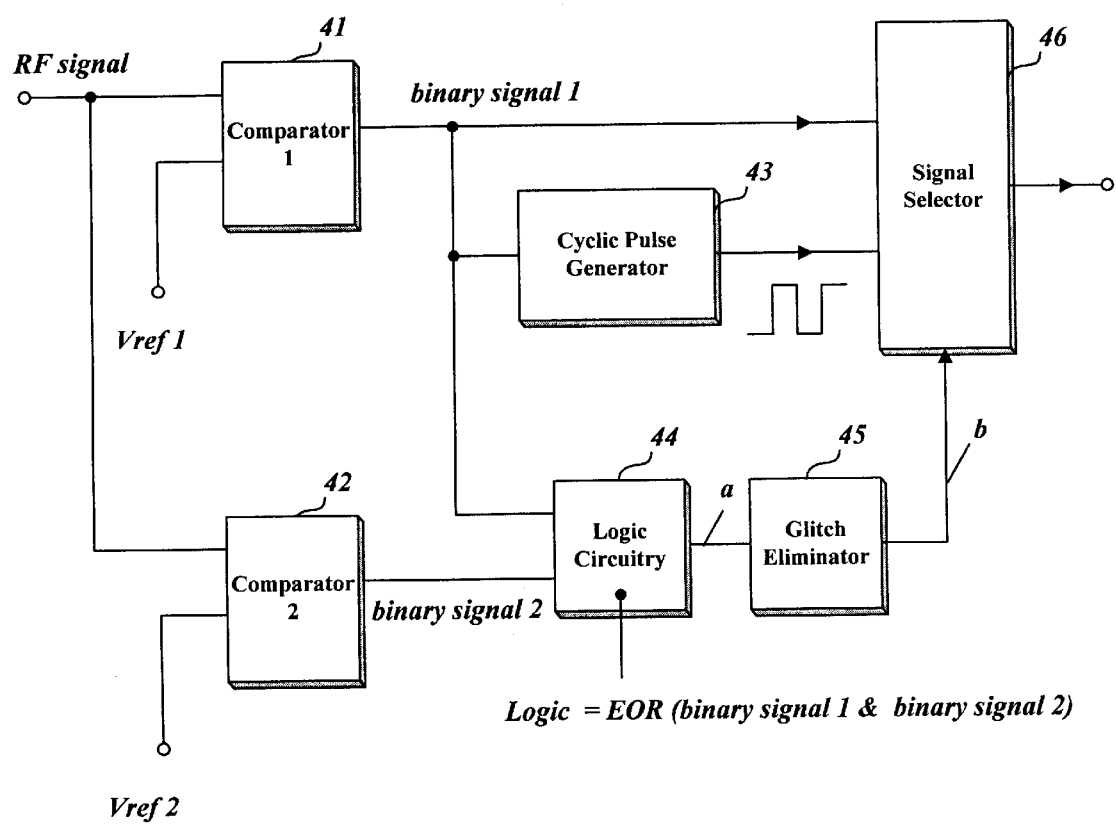
FIG. 4 is a detailed block diagram of the multi-level comparator of the apparatus of FIG. 3.

FIG. 4 is a detailed block diagram of the multi-level comparator 40. The multi-level comparator 40 of FIG. 4 comprises a first internal comparator 41 converting the reproduced RF signal into a first binary signal through triggering the RF signal with a reference level 'Vref1' which is above zero level; a second internal comparator 42 converting the reproduced RF signal into a second binary signal through triggering the RF signal with another reference level 'Vref2' which is below zero level; a cyclic pulse generator 43 generating a periodic pulse signal synchronized with the first binary signal in phase; a signal selector 46 for selecting one to output among the first binary signal and the periodic pulse signal; a logic circuitry 44 outputting a difference signal between the two binary signals through conducting an exclusive-OR operation of the two binary signals; and a glitch eliminator 45 passing pulses of the difference signal from the logic circuitry 44 to a signal selector 46 only when the pulse width is broader than a certain range.

Figure 5:
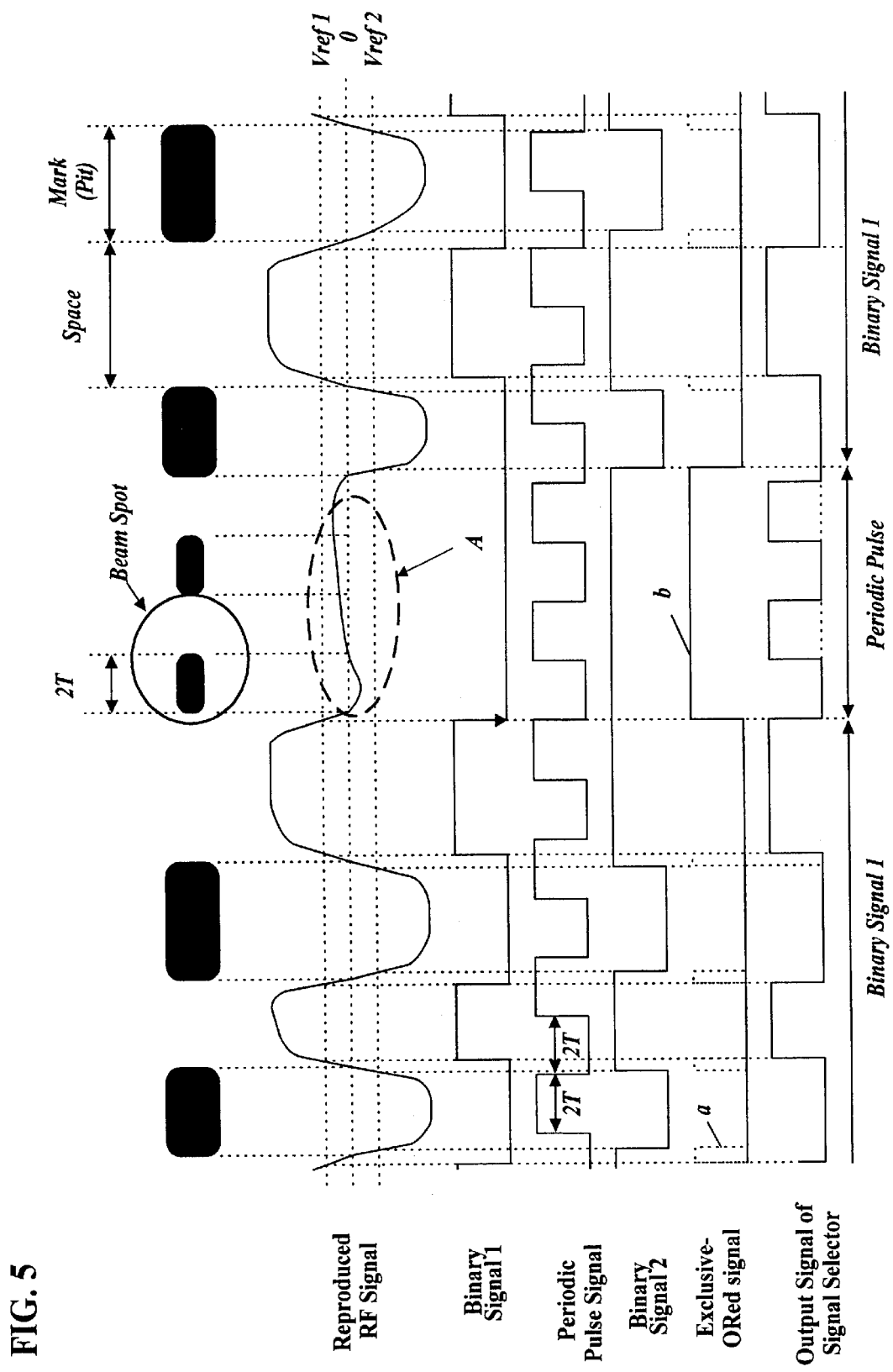
FIG. 5 shows an example of recorded mark or pit pattern and waveforms produced at several points of the apparatus of FIG. 3 when reproducing the pattern.

FIG. 5 shows an example of recorded mark or pit pattern and a timing diagram produced from the pattern. The data reproducing method embodying the present invention conducted by the optical disk device configured as FIGS. 3 and 4 is described in detail.

The optical pickup 2 makes a laser beam be incident onto mark or pit trains formed along a track of a recording surface of the disk 10 as shown in FIG. 5, and converts the reflected beam from the beam spot into an electrical signal. The beam reflected from a mark or a pit is converted into a low-level electrical signal, whereas the reflected one from a space between marks or pits is converted into a high-level signal.

In the meantime, a minimum-length mark or pit and/or space between mark or pit has been formed in the disk 10 such that its length is shorter than the radius of a reproducing beam spot in order to enhance the recording efficiency of a track. The length shorter than the radius of a reproducing beam spot is shorter than 3T which is the length of the shortest pit or space in a conventional art.

For example, the minimum-length mark has been formed such that its length is 2T.

The RF signal reproduced at such-formed minimum-length mark or pit can not be separated far away from a zero level as shown in 'A' of FIG. 5. The reproduced RF signal containing the monotonously-changing curve marked as 'A' which stays around the zero level is applied to both of the first and second internal comparators 41 and 42 of the multi-level comparator 40.

The first internal comparator 41 compares the applied RF signal with the reference level 'Vref1' and converts it into a binary signal which is, in turn, transmitted to the signal selector 46, the logic circuitry 44, and the cyclic pulse generator 43 which is generating a periodic pulse of which level duration is equal to the length of the 2T mark or pit. The cyclic pulse generator 43 adjusts the speed of the periodic pulse to synchronize the falling edge of the periodic pulse with that of the binary signal, and then applies the synchronized periodic pulse to another input terminal of the signal selector 46.

In the meantime, the second internal comparator 42 compares the applied RF signal with the reference level 'Vref2', converts it into another binary signal, and sends the binary signal to the logic circuitry 44. The logic circuitry 44 conducts an exclusive-OR operation of the two inputted binary signals to obtain a difference signal which has a high pulse at where the levels of the two binary signals are different each other, and transmits the difference signal to the glitch eliminator 45. The glitch eliminator 45 blocks a short pulse, that is, glitch of which duration is shorter than a predetermined time length whereas passing the other long pulse to the signal selector 46.

The signal selector 46 selects and outputs the binary signal from the first internal comparator 41 or the periodic pulse signal from the cyclic pulse generator 43 based on whether the level of the glitch-eliminated difference signal from the glitch eliminator 45 is high or low.

That is, the signal selector 46 outputs the periodic pulse signal, which has short pulse corresponding to 2T mark or pit, from the cyclic pulse generator 43 to the PLL 5 while the difference signal is in the state of high level marked 'b' in FIG. 5.

The PLL 5 synchronizes the reference clock with the periodic pulse signal or the binary signal from the first comparator 41 in phase, and then applies the signal selected at the signal selector 46 to the bit stream generator 6 along with the synchronized reference clock.

The bit stream generator 6 converts the applied signal, which is combined from a reproduced signal corresponding to marks and spaces formed in the disk 10 and a constructed pulse signal for 2T mark or pit, into bit stream referring to the synchronized reference clock, and the demodulator 7 restores the bit stream into original data written in the disk 10 while correcting the restored data based on the channel correction code contained in the bit stream.

As explained above, the mark or pit shorter than 3T can be restored to original data normally through the operation of the equipped multi-level comparator 40 comprising two internal comparators 41 and 42 using different slicing levels 'Vref1' and 'Vref2' respectively; a cyclic pulse generator 43 generating a periodic pulse signal whose width is shorter than 3T which is time length of the shortest mark or pit in a conventional art; and a signal selector 46 selecting one from the reproduced binary signal and the periodic pulse signal.

Therefore, the mark or pit can be formed more shortly than conventional art without data loss in reproduction. In the above embodiment, the minimum-length mark/pit and/or space has 2T in time length, however, the minimum-length mark/pit and/or space can be more shorter, for example, 1.5T, than 2T without departing from the technical characteristics explained above.

The apparatus and method of reproducing data recorded in an optical disk according to the present invention, making it possible to form a distinguishable minimum-length pit or mark more shortly, thereby enhancing the recording capacity of a track formed on an optical disk.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reproducing data from an optical disk, comprising:
    a signal detector converting a high-frequency signal reproduced from the disk into a plurality of binary signals by comparing the reproduced signal with two or more slicing levels which are different from each other, and outputting one of the plurality of binary signals or a periodic pulse signal based on the difference magnitude between the plurality of binary signals, said signal detector including a selector for selecting either the one of the plurality of binary signals or the periodic pulse signal based on said difference magnitude so as to selectively provide the one of the binary signals or the periodic pulse signals as a reproduced signal; and
    a data converter synchronizing a reference clock with the signal from said signal detector and restoring the signal from said signal detector into bit stream using the synchronized reference clock.

2. The apparatus set forth in claim 1, wherein said signal detector further comprises:
    a plurality of comparators comparing the reproduced signal with the two or more respective slicing levels and converting the reproduced signal into the plurality of binary signals according to the respective signal comparison; and
    an output controller conducting a logic operation of the plurality of binary signals and controlling the signal selection of said selector based on the level of the signal resulted from the conducted logic operation.

3. The apparatus set forth in claim 2, wherein said output controller comprises:
    a logic circuitry conducting an exclusive OR operation of the plurality of binary signals to produce a difference signal which has a pulse at where the levels of the plurality of binary signals are different; and
    a glitch eliminator passing a pulse of the difference signal of which duration is longer than a predetermined range.

4. The apparatus set forth in claim 1, wherein the period of the periodic pulse signal corresponds to the minimum length of a marked phase or an unmarked phase formed in the disk.

5. A method for reproducing data recorded in an optical disk, comprising the steps of:
    (a) converting a high-frequency signal reproduced from the disk into a plurality of binary signals by comparing the reproduced signal with two or more slicing levels which are different from each other, and selecting either one of the plurality of binary signals or a periodic pulse signal based on the difference magnitude between the plurality of binary signals so as to selectively provide the one of the binary signals or the periodic pulse signals as a reproduced signal; and
    (b) synchronizing a reference clock with the selected signal and restoring the selected signal into bit stream using the synchronized reference clock.

6. The method set forth in claim 5, wherein the period of the periodic pulse signal corresponds to the minimum length of a marked phase or an unmarked phase formed in the disk.

7. The method set forth in claim 5, wherein said step (a) comprises the steps of:
    (a1) comparing the reproduced signal with the two or more respective slicing levels and converting the reproduced signal into the plurality of binary signals according to the respective signal comparison; and
    (a2) conducting a logic operation of the plurality of binary signals and selecting the one of the plurality of binary signals or the periodic pulse signal based on the level of the signal resulted from the conducted logic operation.

8. The method set forth in claim 7, wherein said step (a2) selects a signal based on the pulse level of the resulted signal of which duration is longer than a predetermined range.

9. The method set forth in claim 7, wherein said step (a2) selects the periodic pulse signal if the resulted signal is high.

10. The method set forth in claim 7, wherein the logic operation is an exclusive OR operation.

11. The method set forth in claim 7, wherein said step (a2) selects the one of the plurality of binary signals if the resulted signal is low.

12. The method set forth in claim 5, wherein the slicing levels include a first reference level being above a zero level and a second reference level being below a zero level.

13. The apparatus set forth in claim 1, wherein the slicing levels include a first reference level being above a zero level and a second reference level being below a zero level.

14. The apparatus set forth in claim 2, wherein the logic operation is an exclusive OR operation.

* * * * *